United States Patent

[11] 3,614,734

[72] Inventor Charles E. Davis
 4608 Gilbert Ave., Dallas, Tex. 75219
[21] Appl. No. 737,513
[22] Filed June 17, 1968
[45] Patented Oct. 19, 1971

[54] AUTO ALARM SYSTEM
 14 Claims, 1 Drawing Fig.
[52] U.S. Cl. ..................................... 340/64,
 340/63, 340/248 B, 340/249
[51] Int. Cl. ..................................... B60r 25/00,
 G08b 13/00
[50] Field of Search ........................... 340/64,
 248, 63; 180/114; 307/10

[56] References Cited
UNITED STATES PATENTS
3,209,326  9/1965  Heiser ........................... 340/63
3,341,748  9/1967  Kammiller ..................... 340/248 B
3,383,522  5/1968  Apfelbeck et al. ............. 340/248 B Primary Examiner—John W. Caldwell
Assistant Examiner—Howard Cohen
Attorney—Howard E. Moore ABSTRACT: An automobile alarm system having a monostable multivibrator, an external trigger circuit and a driving circuit to actuate a relay to sound an an alarm when an abrupt increase in current drawn from automobile battery causes a temporary voltage change. The alarm is automatically deenergized after a predetermined period of time to prevent excessive drain of power from the battery.

PATENTED OCT 19 1971
3,614,734
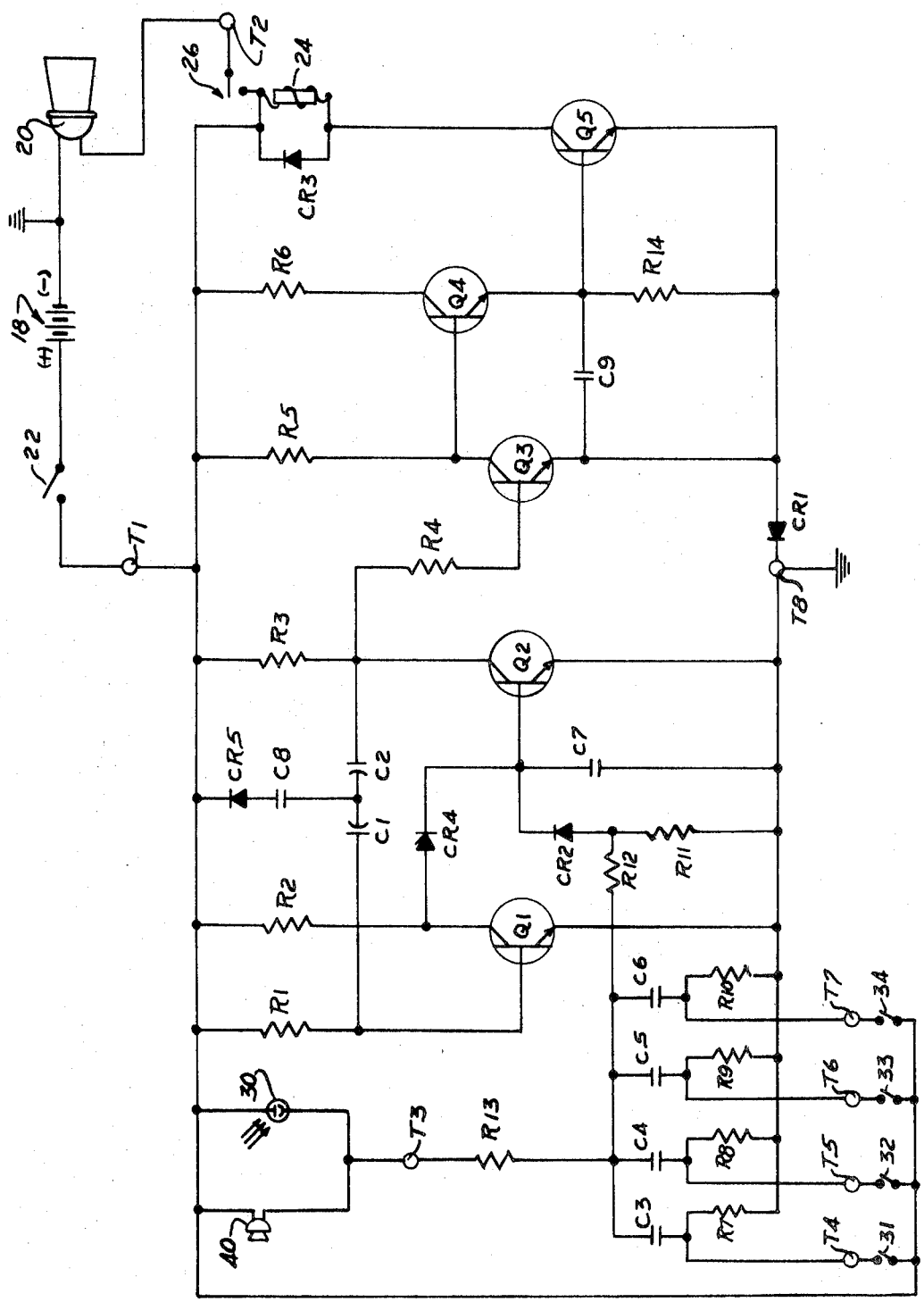
INVENTOR
CHARLES E. DAVIS
BY Howard E. Moore
ATTORNEY

AUTO ALARM SYSTEM

BACKGROUND OF THE INVENTION

Theft and vandalism of automobiles is an increasing problem. Warning devices such as buzzers have been placed on many late model automobiles to warn the driver when he attempts to exit the automobile that the key is still in the ignition switch. Many cities and states have passed laws imposing civil and criminal liability upon the owner of a motor vehicle which is left unattended with a key in the ignition switch.

Notwithstanding these precautionary measures, thousands of motor vehicles are misappropriated annually. A skilled car thief can pick locks and hot-wire an automobile in a few minutes.

Heretofore numerous devices have been developed to prevent unauthorized use of motor vehicles. However, these devices have been unduly complicated, difficult to install, expensive and totally unsatisfactory for many reasons. Most alarm devices after being actuated by sitting in the driver's seat, raising the hood, picking locks, or other unauthorized acts continue to sound until the battery runs down. Even if the thief or vandal is scared away, the motor vehicle is inoperative when the owner returns.

SUMMARY OF THE INVENTION

I have developed an alarm system for motor vehicles which is actuated by a negative voltage change across the battery causing the alarm to sound for a predetermined period of time, for example 80 to 120 seconds. The alarm is set when the driver leaves the automobile by the use of a key switch on the chassis. After the alarm has been set any unauthorized use of the automobile which causes a drain of current such as turning on the dome light when the door is opened, turning on the radio, or using the cigarette lighter will trigger the alarm system causing the horn or other alarm device to sound.

It is, therefore, a primary object of the invention to provide an alarm system for motor vehicles which is automatically turned off after a predetermined period of time elapses.

Another object of the invention is to provide an alarm system for motor vehicles which is activated by any abrupt increase in current being drawn from the battery.

Another object of the invention is to provide an alarm system for motor vehicles which may be quickly and easily installed in the electrical system of any automobile without expensive modifications.

Another object of the invention is to provide an alarm system for motor vehicles which is inexpensive to manufacture.

A further object of the invention is to provide an alarm system for motor vehicles the operation of which is unaffected by weather conditions such as very high or low temperature.

A still further object of the invention is to provide an alarm system for motor vehicles having solid state components which are highly resistant to shock and vibration damage.

Other and further objects of the invention will become apparent upon reading the detailed specification hereinafter following and by referring to the drawing annexed hereto.

DESCRIPTION OF THE DRAWING

The accompanying drawing of a preferred embodiment of the present invention is provided so that the invention may be better and more fully understood, in which:

The figure is a wiring diagram of the invention in relation to associated wiring of a motor vehicle.

Numeral references are employed to indicate the various parts as shown in the drawing and like numerals indicate like parts throughout the various figures of the drawing.

DESCRIPTION OF PREFERRED EMBODIMENT

Referring to the drawing the numeral 1 generally designates the alarm device having terminals T1, T2, T3, T4, T5, T6, T7 and T8.

Terminal T1 of the alarm system is connected through switches to the positive terminal of battery 18 while terminal T8 of the alarm system is connected to the vehicles chassis which is connected to the negative terminal of the battery. Terminal T2 is connected in series with an alarm device or horn 20 to the negative terminal of battery 18.

Switch 22 which is positioned in any convenient location on the chassis of a motor vehicle is manually closed by the driver to set the alarm device. Preferably switch 22 is operated with a key. I anticipate positioning the switch behind the door lock wherein switch 22 may be closed as the door is locked and opened as the door is unlocked. However, switch 22 is positioned such that opening the door or unlocking the door without the use of a key will not deactivate the alarm device.

The theory of operation of the alarm system centers around the fact that an abrupt increase in current being drawn from the battery 18 causes a temporary voltage change dependent on the amount of current drawn. The voltage change causes current to flow through relay 24, as will be hereinafter explained, closing contacts 26 of relay 24, thereby completing a circuit from positive terminal of battery 18 through switch 22 to terminal T1, to terminal T2, to horn 20, to the negative terminal of battery 18. When the circuit is closed horn 20 will sound for a predetermined period of time after which relay 24 will be deactivated opening contacts 26 causing horn 20 to stop sounding.

The wiring diagram illustrated in the drawing consists of a special monostable multivibrator, an external trigger circuit and a driver circuit connected to relay 24 for actuating the alarm 20.

The special monostable consists of transistors Q1 and Q2 and their associated components, resistors R1, R2 and R3; rectifiers CR4 and CR5; and capacitors C1, C2, C7 and C8.

For reasons of economy and simplicity, silicon NPN transistors are utilized in the special monostable multivibrator as well as for the associated circuits necessary to drive the relay. It should be noted that PNP, unijunction and Field Effect Transistors (FET) are also suitable for use in the present invention. However, the silicon NPN transistor affords a simple and economical design and retains the parameters necessary for dependable operation in an environment subject to wide temperature variations and periodic vibration. The objects and results attained by the present invention may also be implemented by a single integrated circuit.

Silicon diode rectifiers as well as others well known to those skilled in the art, are suitable for use as components of the alarm device.

In the static condition transistor Q1 is biased "on" while transistor Q2 is biased "off" causing the collector of transistor Q2 to have a high voltage (for example, 6 volts) whereas the collector of transistor Q1 has a low voltage (approximately 0 volts).

Transistors Q1 and Q3 are normally conducting. However, a voltage drop at the base of transistors Q1 and Q3 turns them off.

Capacitor C7 prevents the monostable from automatically triggering to the operating mode when power is applied by closing switch 22 and insures that the static condition exists when power is applied to the circuit.

During the static condition capacitors C1 and C2 act as a single nonpolarized capacitor charging through resistor R3. This charging begins the instant the static condition exists and continues for approximately 2 seconds at which time the capacitors C1 and C2 are charged to a voltage high enough so that the monostable may be triggered into the operating mode.

Two capacitors, C1 and C2, connected in series, are utilized rather than a single capacitor of equivalent capacitance to prevent leakage when heated. Capacitors C1 and C2 are connected in a back to back configuration which tends to prevent leakage thereby providing dependable operation of the circuit.

Capacitor C8, connected in series with rectifier CR5 which is connected to the junction between capacitors C1 and C2 increases the sensitivity of the monostable. Rectifier CR5 assures that only changes in potential in the negative direction, as would be caused by an increase in the amount of current being drawn from battery 18, will cause capacitors C1 and C2 to trigger the monostable into the operating mode.

Omission of rectifier CR5 would present the possibility that a large decrease in current being drawn might cause the monostable to trigger back to the static mode prior to the normal time out period.

The branch of the network containing rectifier CR5 and capacitor C8 may be omitted from the circuit to decrease the sensitivity thereof. However, it should be noted that omission of one of the elements, rectifier CR5 or capacitor C8, requires omission of the other also.

Resistor R1 is positioned in a branch line between the positive terminal of battery 18 and the base of transistor Q1 furnishing current to the base of transistor Q1 during the static mode thereby maintaining said transistor in the "on" condition. Resistor R1 is also between capacitors C1 and C2 and the positive terminal. Therefore, the value of resistor R1 effects the time required to charge capacitors C1 and C2 when there is a voltage change across battery 18.

Resistor R2, connected between the positive terminal of battery 18 and the collector of transistor Q1, limits the collector current and routes current to the base of transistor Q2 in the triggered mode.

Resistor R3 is positioned in the branch between the positive terminal of battery 18 and the collector of transistor Q2, thereby limiting the collector current during the triggered mode.

Resistor R4, in the branch between the collector of transistor Q2 and the base of transistor Q3, acting in conjunction with resistor R3, limits the drive current to the base of transistor Q3 during the static mode and protects the base to emitter junction of transistor Q1 during the triggered mode. Resistors R3 and R4 act as a voltage divider through transistor Q3 when the monostable is in the static condition.

When current is drained from battery 18 for any reason such as turning on the headlights of the vehicle, there is a voltage drop across the monostable, causing the monostable to trigger into the operating mode, thus providing a reverse condition wherein transistor Q2 is "on" and transistor Q1 is "off."

If the potential to the collector of transistor Q2 drops 5 volts, the potential on the base of transistor Q1 will also drop 5 volts from its previous static condition which ideally is about 0.6 volts, caused by the emitter to base junction of transistor Q1. The instantaneous potential on the base of transistor Q1 is negative 4.4 volts, causing transistor Q1 to turn "off." When transistor Q1 is "off" its collector tends to go high except that its collector is connected to the base of transistor Q2 through rectifier CR4 so that transistor Q2 is furnished current through resistor R2 causing transistor Q2 to remain "on" until capacitors C1 and C2 charge from a negative 4.4 volts back to a positive 0.6 volts at which time transistor Q1 will be forward biased, causing the monostable to trigger back into the static mode.

The "on time" or time constant is determined by the battery voltage and the values of capacitor C1 and C2 in series with resistor R1. The basic formula for determining the time constant is $tc=RC$ or the time required to charge to $0.63 \times RC$ of maximum voltage is equal to resistance times capacitance. For example, $tc=(470\times10^3) (250\times10^{16})=(2.5) (4.7) (10)=117.5$ seconds. There are other factors which influence this operating time. However, because construction of a monostable trigger, having characteristics suitable for use with the present invention, in view of the above description, is within the capability of a person having ordinary skill in the art further explanation is not deemed necessary.

To increase the versatility and effectiveness of the auto alarm system which I have developed I have incorporated an external trigger circuit which will operate the alarm whenever any external capacitive trigger terminal T4–T7 is connected to the positive terminal of battery 18.

The external trigger circuit is not necessary for successful operation of the special monostable oscillator herein before described because the monostable may be triggered by a voltage change across battery 18. However, the external trigger circuit provides an alternate means for triggering the monostable into the operating mode to cause the horn 20 to sound.

The external trigger circuit consists of rectifier CR2; capacitors C3, C4, C5, C6 and C7; and resistors R8, R9, R10, R11, R12 and R13. The function of the external trigger is to provide a positive and only a positive pulse to the base of transistor Q2 of a magnitude such that transistor Q2 will be forced "on." A rectifier, such as diode CR2, insures that no negative pulse can be fed to the base of transistor Q2. Rectifier CR4, a part of the monostable circuit, blocks any positive pulses through the external trigger to the collector of transistor Q1. Resistor R11 allows a charge on capacitors C3 or C4 or C5 or C6 to bleed off on the side adjacent resistor R12 and rectifier CR2.

Resistors R7, R8, R9 and R10 serve the same purpose except that they bleed each individual capacitor to ground. During the static condition, capacitors C3, C4, C5 and C6 have both plates at ground or very near ground potential.

Terminals T4–T7 are connected through switching devices 31, 32, 33 and 34 respectively to the positive terminal of battery 18. Switches 31–34 may be of any suitable construction having contacts which are closed by applying or removing a physical force. The switches may be placed in any desired location to be closed by specific acts such as raising the hood or the trunk lid, removing a hub cap, or opening a window.

Assuming that T4 is connected to the positive terminal of a 12-volt battery 18 by closing switch 31 by some act such as raising the hood of the vehicle, there will be 12 volts across capacitor C3 causing the monostable to trigger. However, even though this voltage might remain on terminal T4 only a very small current flows through rectifier CR2 and resistor R11 bleeds the charge on the side of capacitor C3 adjacent to rectifier CR2 back to ground so that even though terminal T4 has a positive voltage on it, a positive voltage at terminal T5 caused by closing switch 32 by some act such as opening the trunk lid, may also cause the monostable to trigger whereas a positive voltage at T4 no longer has any effect on the monostable. The pulse required to set or trigger the monostable lasts a short period of time and is limited to the time constant of each RC network, for example, resistor R7, capacitor C3 and resistor R11; or resistor R10, capacitor C6 and resistor R11. Calculations indicate that a duration as short as 0.05 seconds is far more than enough to trigger the monostable.

Terminal T3 provides a sensitive continuous external trigger which is sensitive to static charges thereby serving as a second alternate method of triggering the monostable into the operating mode. Terminal T3 is connected to override the timing out feature as long as the voltage is present at that point since no capacitor is provided in this branch of the circuit.

When a charge is felt on terminal T3 it is fed to the base of transistor Q2 turning Q2 "on" causing its collector to go low. When the collector of transistor Q2 is low transistor Q1 is turned "off" as hereinbefore explained. Transistor Q2 stays "on" as long as terminal T3 has a voltage thereon.

Terminal T3 may be connected to the positive terminal of battery 18 or any other source of electrical power through a switching device 30.

Switching device 30 may be a photoelectric device commonly known as a photoresistor or photoconductive transducer wherein the electrical resistance thereof varies from a high value in darkness to a low value when exposed to light. Photoconductive cells are inexpensive and may be installed with minimum difficulty. Photocells may be installed in window grooves to sound the alarm when a window is broken or lowered. When switching device 30 is in darkness the resistance thereof is very high and the voltage at the base of transistor Q2 is low maintaining transistor Q2 "off." When switching device 30 is exposed to light, its resistance drops and transistor Q2 is turned "on."

The switching device may also be a sound-detecting device 40, such as a carbon microphone positioned inside the vehicle, tuned so that random outside noise has no effect thereon. The sound detecting device 40 is actuated by an instantaneous increase in pressure inside the vehicle if a window glass is broken causing voltage to be generated to sound the alarm.

It should be noted the voltage from the sound or pressure detecting device 40 is an instantaneous pulse which causes the alarm 20 to sound. The voltage change across battery 18 when the alarm 20 is energized will trigger monostable into the operating mode for the duration of the timing cycle.

Transistor Q3 is a common emitter circuit for inverting or reversing the polarity of the signal with respect to its emitter and base terminals.

If the signal utilized for actuating relay 24 were taken from transistor Q1 instead of transistor Q2, transistor Q3 would be unnecessary. However, the output of transistor Q2 must be used since resistor R3 and resistor R4 act as a voltage divider such that the junction of resistor R3 and R4 can never go higher than half the battery voltage. This is necessary to insure that the negative or reverse base to emitter voltage never reaches a magnitude great enough to burn out transistor Q1.

While transistor Q1 could be protected with a diode to ground with its cathode at the base of transistor Q1, this would shorten the time constant or the "on time" of the alarm.

When the collector of transistor Q2 connected to the base of transistor Q3, goes low in the triggered mode, transistor Q3 turns "off," causing its collector to go high. It should be noted that if transistor Q3 were omitted from the circuit, when transistor Q2 is "on" during the triggered stage, its collector is low and therefore cannot drive transistors Q4 or Q5. Therefore, the inversion characteristic of the circuit utilizing transistor Q3 is necessary to insure that the reverse base to emitter voltage on transistor Q1 is maintained within safe operating limits and to invert the voltage to drive transistors Q4 and Q5 in the driver circuit.

The driver circuit consists of transistor Q3, Q4 and Q5 and their associated components; resistors R5, R6 and R14, and capacitor C9. The driver circuit is connected in a configuration known as a cascaded RC-coupled amplifier providing high current gain and phase inversion.

Transistor Q3, having its base connected through resistor R4 to the collector of transistor Q2, is a common emitter inverter circuit.

Transistor Q4 forms an emitter follower circuit.

Transistor Q5 is an inverter circuit.

Use of an emitter follower, transistor Q4, provides high current gain as well as isolation of transistor Q5 from transistors Q1, Q2 and Q3 since Z (in)=(B+1) (RL).

It should be noted that the common emitter circuits, transistors Q3 and Q5, reverse the polarity of the signal with respect to their emitter and base terminals. This phase reversal is inherent in the common emitter circuit; however, it provides maximum voltage gain for a given transistor.

It should be obvious to a person having ordinary skill in the art that analogous circuitry may be constructed utilizing vacuum tubes.

When the collector of transistor Q3 goes high during the triggered mode, the base of transistor Q4 draws current through the collector resistor R5 of transistor Q3. Transistor Q4 is then forward biased and will turn "on" shorting its collector resistor R6 to the base of transistor Q5. This turns "on" transistor Q5 and grounds one side of relay 24 thus closing contacts 26 of said relay 24.

From the foregoing it should be readily apparent that during the static mode transistors Q1 and Q3 are "on" while transistors Q2, Q4 and Q5 are "off." During the operating condition transistors Q1 and Q3 are "off" while transistors Q2, Q4 and Q5 are "on."

Rectifier CR3 is connected in parallel with the coil of relay 24 to absorb the reverse EMF that results when transistor Q5 has been "on" and then turns "off." Without rectifier CR3 the circuit would function properly only one time because when the system transfers to the static mode transistor Q5 would be burned out by the reverse electromotive force from the coil of relay 24.

Capacitor C9 and resistor R14 act as a damping network to prevent periodic audio oscillations of transistor Q5 and relay 24 during the static mode.

Rectifier CR1 is provided to protect the alarm system preventing the system from burning out in the event that the alarm system is connected in reverse with terminal T1 at ground and the normally grounded connection T8 to the positive terminal of battery 18. Rectifier CR1 protects transistors Q3, Q4 and Q5.

From the foregoing it should be readily apparent that I have provided an alarm system for an automobile which is very simple to construct and install in the conventional electrical system of any motor vehicle. The alarm system may be installed by connecting terminal T1 to the positive terminal of battery 18 while terminal T8 is grounded as is the negative terminal of the battery 18. Terminal T2 is connected to the horn circuit. Any drain of current from battery 18, such as turning on the dome light when the door is opened, causes a temporary voltage change across the alarm system thereby triggering the monostable sending a signal through the driver circuit causing relay 24 to be actuated closing contacts 26 making a circuit through horn 20 causing the horn to sound. The horn 20 will continue to sound until the output of the monostable is cut off when capacitors C1 and C2 become charged thereby cutting off the signal causing contact 26 to open.

One or more of the terminals T4 through T7 may be connected through switches 31–34 positioned at any desired location on the automobile for increasing the versatility of the device. Although not shown, switches 31–34 might also be connected to some light sensing device or microphone.

Connection of terminal T3 of the sensitive continuous external trigger causes transistor Q2 of the monostable to remain on as long as the voltage is applied to terminal T3. Provision of the external trigger circuit makes the alarm system adaptable to numerous variations in application. However, the external trigger is not necessary for successful operation of the alarm system.

While the alarm system which I have developed has been explained in conjunction with an alarm system for motor vehicles, I anticipate other applications of my invention to provide a warning that there has been a change in current being drawn from a storage battery or a change in voltage on a power supply.

It will be understood that other and further embodiments of my invention may be made without departing from the spirit and scope of the appended claims.

Having described my invention, I claim:

1. In an alarm system for a motor vehicle, a source of electrical power having a positive terminal and a negative terminal; an alarm device connected to one terminal of said source of power; a switching means connected in series with the alarm device and to the other terminal of the source of power, said switching means being adapted to conduct when current is supplied thereto; and a monostable circuit connected between the positive and negative terminals of the source of power adapted to sense a change in voltage across the source of power and to cause a flow of current to energize the switching means to close same when there is a change in the output of the source of power; said monostable circuit comprising, first and second transistors connected in a common emitter configuration; at least one capacitor in a line connecting the collector of the second transistor to the base of the first transistor; a first resistor in a line between the positive terminal of the source of power and a node on one side of the capacitor; and a second resistor in a line between the positive terminal and a node on the other side of the capacitor wherein the duration of the monostable output signal is determined by the time required to charge the capacitor.

2. The combination called for in claim 1 with the addition of means to prevent triggering the monostable circuit by a change in the output of the source of power of a duration shorter than a predetermined time.

3. The combination called for in claim 1 with the addition of rectifier means to protect components of the circuit against reverse connection to the source of power.

4. In an alarm system for a motor vehicle, a battery; a circuit connected to opposite poles of the battery including a monostable oscillator for providing an output signal when the voltage across the battery is changed, said monostable comprising a first transistor, the base thereof being connected through a resistor to the positive terminal of the battery; a second transistor, the base of which is connected to the collector of the first transistor and through a first capacitor to the negative terminal of the battery; and a second capacitor in a branch connecting the base of the first transistor with the collector of the second transistor in a common emitter circuit, wherein the first transistor is biased on and the second transistor to is biased off during the static condition while the first transistor is biased off during the operating condition and the monostable is in the operating condition for a period of time dependent upon the time constant of the RC circuit; an external trigger circuit connected to the base of the second transistor for triggering the monostable when current is supplied thereto; an amplifier in the circuit to increase the magnitude of the output signal; an alarm device connected to one terminal of the battery on the vehicle; and current responsive switching means connected to the alarm and the other terminal of the battery in the circuit with the alarm, the switching means being triggered by the output signal thereby delivering current to the alarm to actuate the alarm.

5. The combination called for in claim 4 with the addition of a rectifier between the base of the second transistor and the collector of the first transistor to block positive pulses to the collector of the first transistor.

6. The combination called for in claim 5 wherein the said first capacitor has sufficient capacitance to prevent triggering of the second transistor by a pulse of a duration shorter than a set time.

7. The combination called for in claim 1 with the addition of an amplifier connected to the monostable adapted to increasing the magnitude of the signal to energize the switching means.

8. The combination called for in claim 7 wherein the amplifier is a plurality of RC-coupled transistors providing high current gain and phase inversion.

9. The combination called for in claim 1 with the addition of at least one external trigger circuit comprising at least one second switching means one side thereof being connected to the positive terminal of the source of power, the other side being connected to the base of the second transistor in the monostable whereby closing the second switching means triggers the monostable to route a signal to the first switching means, the second switching means being positionable in a concealed location on the motor vehicle.

10. The combination called for in claim 9 wherein the switching means is adapted to allow current to pass therethrough when exposed to light.

11. The combination called for in claim 9 wherein the switching means is adapted to be actuated, allowing current to pass therethrough, when exposed to an increase in fluid pressure exerted by the environment adjacent thereto.

12. The combination called for in claim 9 wherein the switching means is sensitive of externally applied forces, allowing current to pass therethrough upon any change in the intensity of force applied thereto.

13. The combination called for in claim 9 with the addition of at least one resistor and at least one capacitor in each external trigger circuit, the said circuit being adapted to drain current from the circuit whereby the output of the monostable will be limited to a predetermined period of time.

14. In an alarm system for a motor vehicle a battery; a circuit connected to opposite poles of the battery including a monostable oscillator for providing an output signal for a set time when the voltage across the battery is changed; an amplifier in the circuit to increase the magnitude of the output signal; an alarm device connected to one terminal of the battery on the vehicle; and current responsive switching means connected to the alarm and the other terminal of the battery in the circuit with the alarm, the switching means being triggered by the output signal thereby delivering a signal to actuate the alarm, said monostable comprising a first transistor, the base thereof being connected through a resistor to the positive terminal of the battery; a second transistor, the base of which is connected to the collector of the first transistor and through a first capacitor to the negative terminal of the battery; and a second capacitor in a branch connecting the base of the first transistor with the collector of the second transistor in a common emitter circuit, wherein the first transistor is biased on and the second transistor is biased off during the static condition while the first transistor is biased off during the operating condition and the monostable is in the operating condition for a period of time dependent upon the time constant of the RC circuit.

PO-1050
(5/69)

UNITED STATES PATENT OFFICE
CERTIFICATE OF CORRECTION

Patent No. 3,614,734　　　　　Dated October 19, 1971

Inventor(s) Charles E. Davis

It is certified that error appears in the above-identified patent and that said Letters Patent are hereby corrected as shown below:

Insert the following claims:

-- 15. The combination called for in Claim 4 wherein the first capacitor is two capacitors connected in series and a third capacitor and a rectifier are connected in series between the node between said first two capacitors and to the positive terminal of the battery whereby the monostable will be triggered into the operating condition by a small voltage change. --

-- 16. The combination called for in Claim 7 wherein the amplifier is connected to the collector of the second transistor for amplifying the monostable output signal to a magnitude capable of actuating the switching means. --

-- 17. The combination called for in Claim 1 with the addition of a key-operated switch in the line connecting the monostable to the positive terminal of the battery for setting the alarm. --

In the heading to the printed specification, "14 Claims" should read -- 17 Claims --.

Signed and sealed this 9th day of May 1972.

(SEAL)
Attest:

EDWARD M. FLETCHER, JR.　　　　　ROBERT GOTTSCHALK
Attesting Officer　　　　　　　　　Commissioner of Patents